Nov. 11, 1952         J. ANTOS         2,617,218
SLIDE VIEWER HAVING TWO COMPARTMENTS, ONE FOR
STORING AND THE OTHER FOR VIEWING SLIDES
Filed Sept. 4, 1948                     4 Sheets-Sheet 1
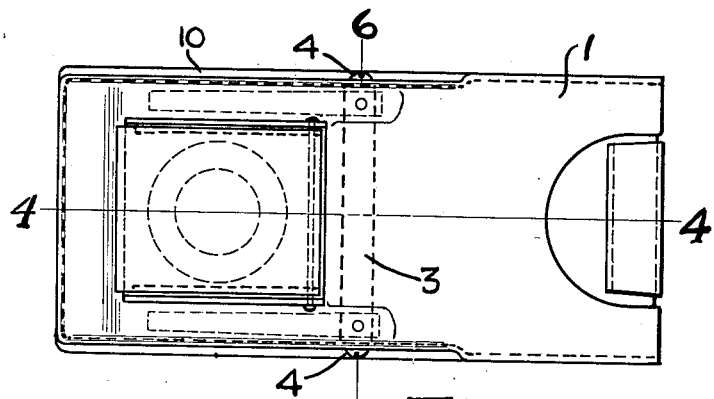
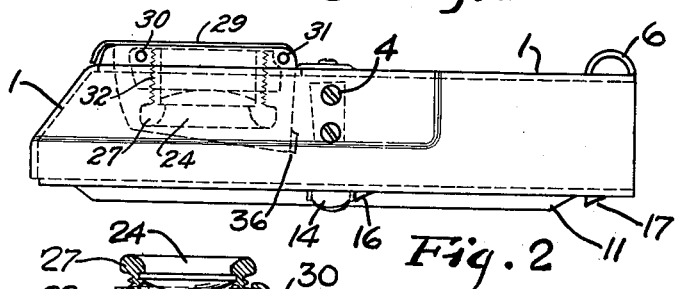
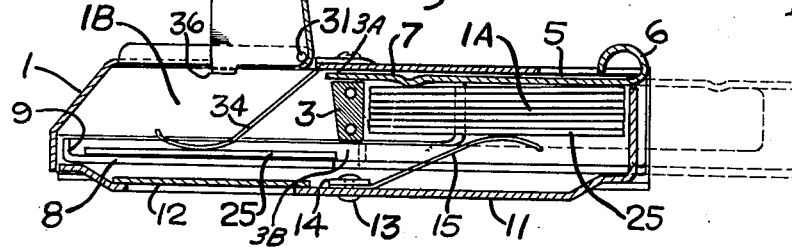
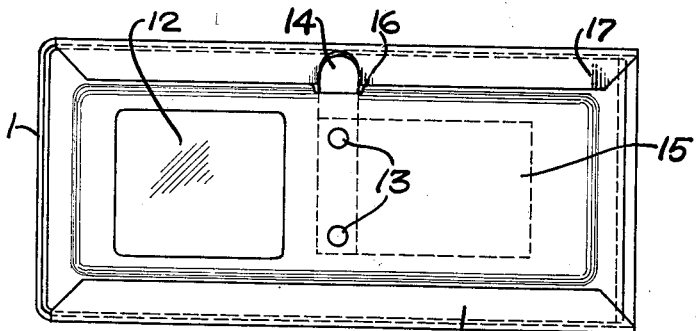
Inventor
Joseph Antos

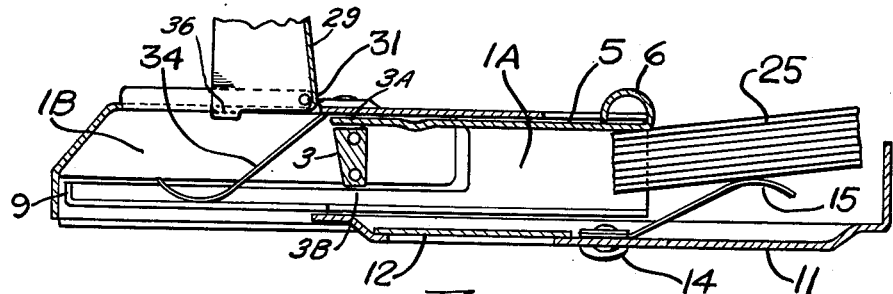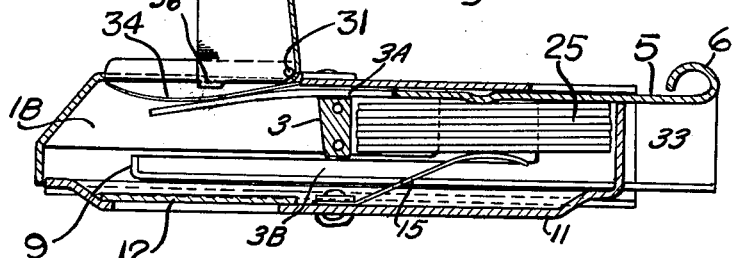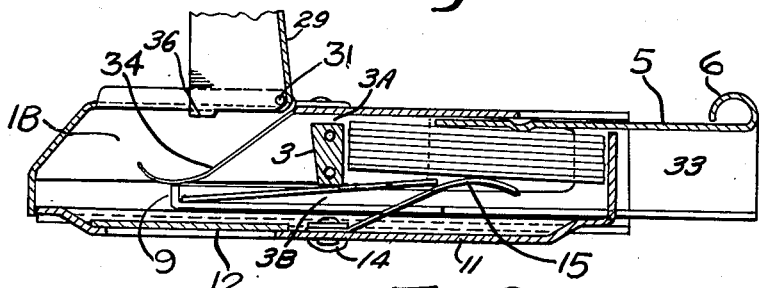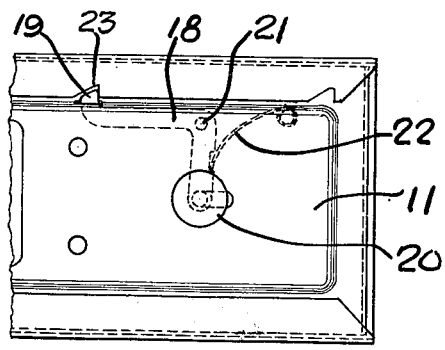

Nov. 11, 1952 J. ANTOS 2,617,218
SLIDE VIEWER HAVING TWO COMPARTMENTS, ONE FOR
STORING AND THE OTHER FOR VIEWING SLIDES
Filed Sept. 4, 1948 4 Sheets-Sheet 3

Inventor
Joseph Antos

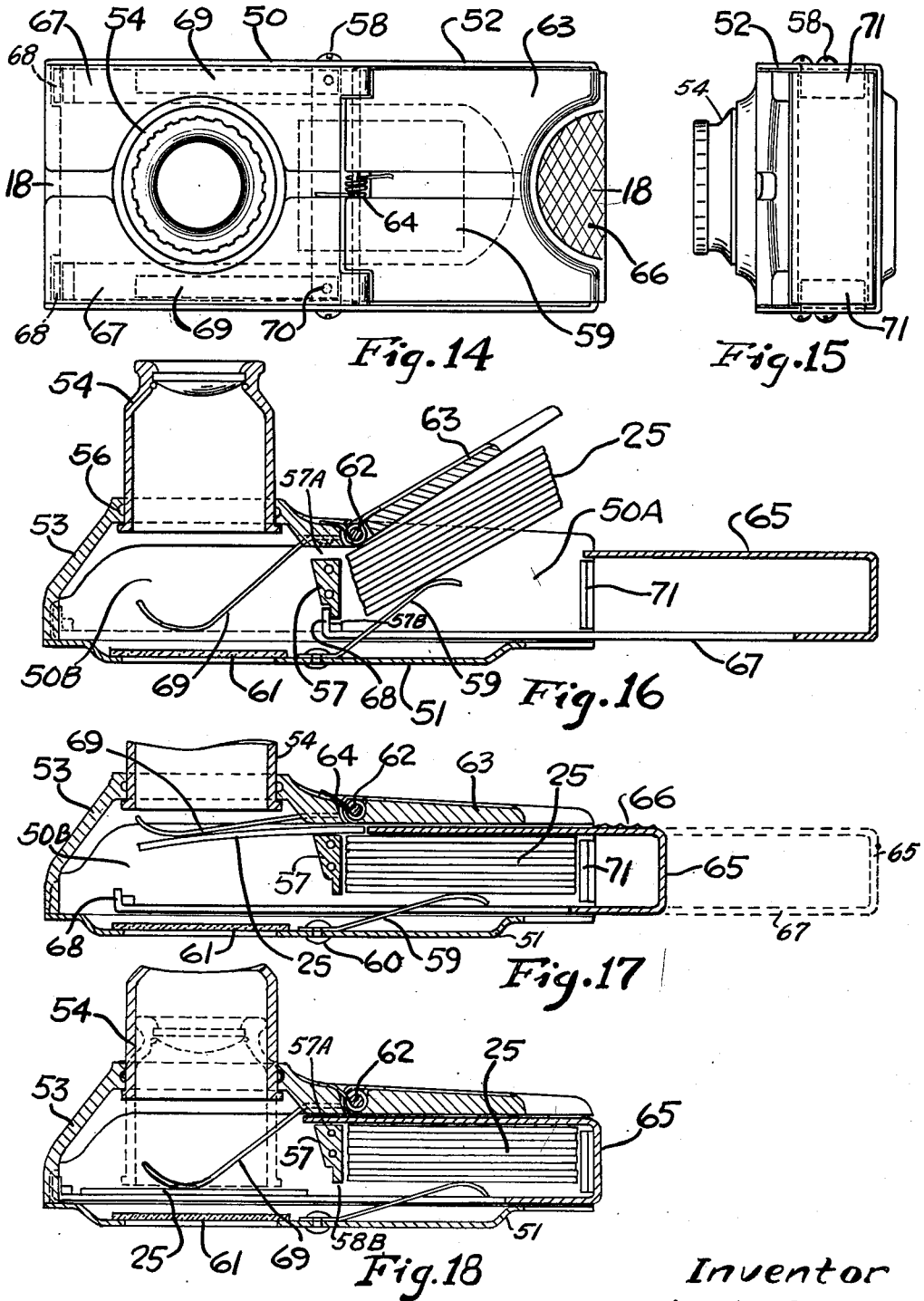

Patented Nov. 11, 1952

2,617,218

UNITED STATES PATENT OFFICE 2,617,218

SLIDE VIEWER HAVING TWO COMPARTMENTS, ONE FOR STORING AND THE OTHER FOR VIEWING SLIDES

Joseph Antos, Aurora, Ill., assignor of one-fourth to James D. Benbow, Aurora, Ill.

Application September 4, 1948, Serial No. 47,806

13 Claims. (Cl. 40—79)

1

My invention relates to a means of providing a compact slide viewer with a compartment for holding slides to be viewed and another compartment for viewing the slides one at a time, also means for transferring the slides one at a time from the storage compartment to the viewing compartment in continuous sequence.

Slide viewers available on the market at present are bulky and consist of simply a viewing chamber. They accommodate only one slide at a time and it is therefore necessary for the user to carry the slides to be viewed in a separate box and manually insert and remove each slide to be shown. This manual handling of slides is awkward and sometimes injurious to the slides.

The object of this invention is to provide a simple compact device for the storing and viewing of transparent pictures commonly known as slides. Another object is to provide a slide viewing device having a compartment for storing one or more slides, another compartment for viewing individual slides, and a slide carrier for moving the said slides from the storage compartment to the viewing compartment and back again to the storage compartment in a continuous sequence until all the slides have been viewed.

Another object is to save time in the viewing of a large number of slides by placing the slides in the viewer in groups rather than individually.

Other objects, advantages, and capabilities inherent in the invention will more fully appear in the accompanying pages.

Referring to the drawings:

Figure 1 is a top view of the complete slide viewer with the lens enclosed.

Figure 2 is a side view of Fig. 1.

Figure 3 is a bottom view of Fig. 1.

Figure 4 is a cross section through 4—4 of Fig. 1 showing slide compartment loaded with slides, first slide in viewing position, and the lens in an open viewing position.

Figure 5 is an end view of Fig. 1.

Figure 6 is a cross section through 6—6 of Fig. 1.

Figure 7 is a cross section through 4—4 of Fig. 1 showing bottom cover plate pulled outwardly and slides being inserted.

Figure 8 is same as Fig. 7 except cover plate is closed with the slides in their proper place, and the slide carrier moving the first slide into viewing position.

Figure 9 is same as Fig. 8 except with slide carrier partly pulled out and viewed slide being pulled into the slide storage compartment.

Figure 10 is a portion of Fig. 3 with a modified form of bottom cover latch.

2

Figure 11:
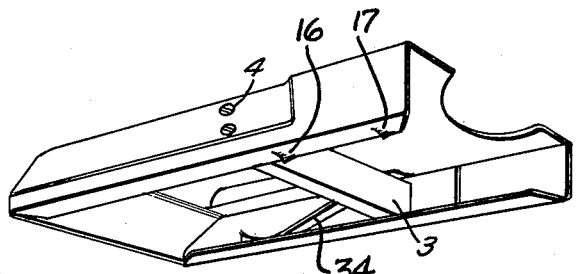

Figure 11 is an isometric view of the viewer without the lens, slide carrier, and the movable bottom.

Figure 12:
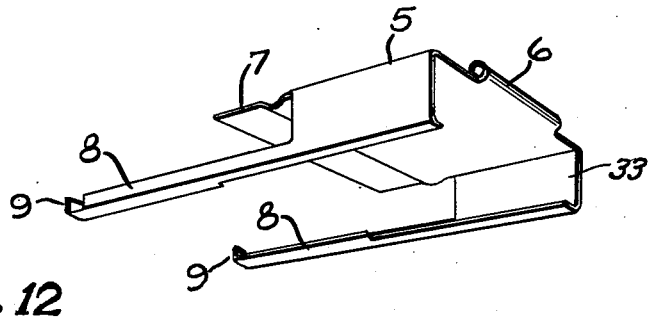

Figure 12 is an isometric view of the slide carrier.

Figure 13:
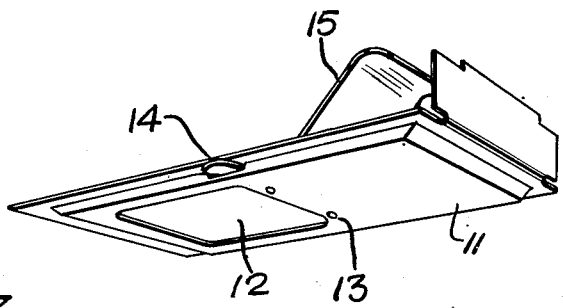

Figure 13 is an isometric view of the movable bottom.

Figure 14 is a top view of an alternately constructed viewer.

Figure 15 is a rear end view of Fig. 14.

Figure 16 is a section showing the loading position of viewer.

Figure 17 is a section similar to Fig. 16 except showing the top slide being pushed from slide storage compartment to viewing compartment.

Figure 18 is a cross section through 18—18 of Fig. 14 showing a slide in the viewing position.

Description

Referring to Figs. 1, 2, 3, 4, 5, 11, 12 and 13, the main parts of the viewer is the container 1, which is rectangular in shape having a top surface, two side walls, and flanged at the bottom at each end 2, and spacing bar or plate 3 attached to the side walls of container 1 with screws or bolts 4 divides the container 1 into compartments, the slide storage compartment 1A and the slide viewing compartment 1B.

Within the container 1 and movably positioned is the U-shaped slide carrier 5. The slide carrier 5 is U-shaped, preferably made of sheet metal with a curled finger grip 6 on one end, a tongued portion 7 at the top with two angular fingers 8 at the bottom extending forward and terminating with hooks 9 at the forward end. These angular fingers 8 are guided within ways 10 which are pressed or formed in the side walls of the container 1.

In the space provided between the bottom of the slide carrier 5 and the inner side of the flanges 2 is inserted the bottom cover 11. See Figs. 4, 5 and 13. This bottom cover 11 is rectangular in shape, recessed and cut out to receive a light diffusing window 12. This window 12 can be made of plastic, Celluloid, or glass and be cemented or riveted in place. In the center of the back and fastened with rivets or other means 13 is a latch spring 14 and slide lifting spring 15. To retain this bottom cover 11 in a closed position the latch spring 14 is made to engage a notch 16 in flange 2, Fig. 4. Another notch 17 is provided to limit the open position of the bottom cover 11, Fig. 7.

Any means of latching the bottom cover can be used. In Fig. 10 an L-shaped latch member 18 is provided with a hook 19 on one end and a button 20 on the opposite end. This is pivoted at 21 to the cover 11 and a spring 22 pushes the hook 19 into the notch 23.

An eyepiece 24 consisting of a magnifying glass 26 fixed within a mounting 27 is adjustably attached to a collar 28. A bracket 29, through its upper hinge pin 30 and lower hinge pin 31, attaches the eyepiece 24 to the viewer body 1, Fig. 4, and is held in alignment by the bent portion 36 of the bracket 29.

To provide focusing of the eyepiece a thread 32 is shown. Rotation of the eyepiece in either direction will then change the distance between the eyepiece 24 and slide 25. While this method is shown, other means such as friction could be used to accomplish the same purpose.

By rotating eyepiece 24, Fig. 4, around hinge pin 30 and then rotating bracket 29 around hinge pin 31 it is possible to collapse the viewer from its viewing compartment 1B. The springs 34 which position shown in Fig. 2.

To describe the operation and use of this viewer, it is necessary to refer first to Fig. 7, the loading position. The bottom 11 has been pulled outwardly to its limit, a group of slides 25 are laid on top of spring 15. Both the slides and the bottom cover 11 are pushed inward to the locked position as shown by full lines in Fig. 4. The spring 15 pushes slides 25 upward against the under side of the tongued surface 7 of slide carrier 5. By moving the slide carrier outwardly to the limit of its travel indicated in the dotted position 33, the top slide 25 will be pushed upward and against the upper inner surface of container 1 and will be in engagement with the inner portion of the tongued surface 7 of the slide carrier 5. Pushing the slide carrier 5 inwardly will move the top slide 25 with it through the slot 3A between the divider bar or spacer plate 3 and the upper inner surface of the container 1. See Fig. 8. The divider bar or spacer plate 3 retains the slide stack in the storage compartment 1A and permits only one slide at a time to pass from the storage compartment through slot 3A to the slide viewing compartment 1B. The springs 34 which are fastened to the upper inner portion 35 of the container 1 will exert a downward push on the slide so that when the slide carrier 5 is pushed all the way in the slide then passes beyond the edge of divider bar 3, drops downwardly and it is held against the fingers 8 and hooks 9 of the slide carrier 5 and in line with the light diffusing glass 12, Fig. 4.

To change to a new slide you pull slide carrier 5 outwardly, see Figs. 8, 9, and dotted position Fig. 4, which will cause the hooks 9 on the end of fingers 8 to engage with the inner edge of viewed slide and return it through lower slot 3B into the bottom of the slide storing compartment 1A between the slide stack and the spring 15. Pushing the slide carrier 5 forward all the way it will insert another new slide into the viewing compartment 1B by the means described previously. See Fig. 8. Thus it is seen that by the outward and inward movement of the slide carrier 5 all the slides inserted in the storage compartment 1A can be viewed.

A modified design incorporating the same basic principles as heretofore described but embodying different construction, we refer to Figs. 14, 15, 16, 17 and 18. The container 50 is somewhat similar to that previously described, being rectangular in shape and consisting of a bottom plate 51 and the side walls 52. The formed top portion 53 of container 50 has a circular or any desired shape hole to receive an adjustable viewing eyepiece 54. Rubber or any other material is provided in the groove 56 to produce necessary friction for molding eyepiece 54 in the proper position. Dotted lines in Fig. 18 show eyepiece 54 in closed or carrying position.

A divider bar 57 is placed within and is attached to side walls 52 of housing 50 with screws 58 or other means thus dividing the container 50 into two compartments, the slide storage compartment 50A and the slide viewing compartment 50B. The bottom portion 51 of container is recessed to receive the slide lifting spring 59 which is attached by rivets or other means 60. Directly below and in line with the viewing eyepiece is a light diffusing window 61.

Directly over the slide storage compartment 50A and pivotally attached by hinge pin 62 is a door 63 for loading and removing slide. A torsion spring 64 is wrapped around hinge pin 62 and causes door 63 to press downward on the slide carrier 65, Fig. 16.

The slide carrier 65 is similar in design to the previously described carrier 5, being movably positioned in the housing, is preferably made of sheet metal; has a flat top section, a knurled finger grip 66, and two flat fingers 67 extending forward and terminating with hooks 68 on the extreme ends.

For pressing down and positioning slides 25 two curved springs 69 are provided, one on each side of housing 50 and having their ends fastened within the recessed portions of the top member 53 by rivets or any other means 70. To retain slides 25 in the slide storage compartment 50A a bent flange 71 is formed on the end of each side wall 52 of the container 50.

Operation of this viewer is somewhat similar to that previously described. For loading I refer to Fig. 16. The slide carrier 65 is pulled outwardly to its limit of travel. The door 63 is lifted upward, and a group of slides 25 is inserted into the slide storage compartment 50A resting on springs 59. As shown, the door 63 is then permitted to drop in place and press on the slide carrier 65 through the action of the spring 64 as shown in Figs. 17 and 18.

Pushing the slide carrier 65 inward will carry the top slide 25 through upper slot 57A into the viewing compartment 50B under springs 69 as shown in Fig. 17. At completion of this forward stroke the slide 25 will drop into the proper viewing position as shown in Fig. 18.

To change to a new slide it is only necessary to pull slide carrier 65 all the way out to remove the viewed slide to the storage compartment 50A and again push it all the way in.

The invention further resides in the combination and arrangement of parts shown in the accompanying drawings; and, while I have shown and described herein preferred embodiments, I wish it understood that the same are susceptible to modification and change without departing from the claims and the spirit of the invention.

I claim:

1. An apparatus for storing and viewing slides or transparent pictures, in combination, a container having two compartments, one for storing one or more slides or transparent pictures and the other for viewing one slide or transparent picture at a time, a division plate with space above and below to permit the movement of a slide from the storage compartment into and out of the viewing compartment, said viewing compartment having front and back openings to permit the passage of light therethrough, a closure cover hinged to said container and adapted for swinging movement between a closed position closing said front opening and an open position extending outwardly from said container substantially at right angles to said front opening, a viewing lens pivotally mounted on said hinged closure cover for swinging movement into an inwardly folded position lying substantially parallel to the under side of said closure cover for reception in said viewing compartment when said closure cover is moved into its closed position, said viewing lens being adapted to be swung outwardly to an operative position projecting substantially at right angles to said closure cover when the latter is swung outwardly to its open position whereby said viewing lens is then disposed substantially parallel with said viewing compartment, slidable bottom having springs attached to apply upward pressure to keep the slide or transparent picture in position to be moved from the storage compartment to the viewing compartment, springs attached to the inside of the top of the viewing compartment to apply downward pressure and hold the slide or transparent picture in viewing position, slidable means to move one slide or transparent picture at a time from the storage compartment to the viewing compartment and return the viewed slide to the bottom of the storage compartment on top of the spring on the slidable bottom and by moving said slidable means inward and outward all the slides or transparent pictures in the storage compartment can be viewed in the viewing compartment and returned to the storage compartment.

2. An apparatus for storing and viewing slides or transparent pictures, in combination, a container having two compartments, one for storing one or more slides or transparent pictures and the other for viewing one slide or transparent picture at a time, a division plate with space above and below to permit the movement of a slide from the storage compartment into and out of the viewing compartment, said viewing compartment having front and back openings to permit the passage of light therethrough, a closure cover hinged to said container and adapted for swinging movement between a closed position closing said front opening and an open position extending outwardly from said container substantially at right angles to said front opening, a viewing lens pivotally mounted on said hinged closure cover for swinging movement into an inwardly folded position lying substantially parallel to the under side of said closure cover for reception in said viewing compartment when said closure cover is moved into its closed position, said viewing lens being adapted to be swung outwardly to an operative position projecting substantially at right angles to said closure cover when the latter is swung outwardly to its open position whereby said viewing lens is then disposed substantially parallel with said viewing compartment, a slidable bottom having springs attached at the storage end to apply upward pressure to keep the slide or transparent picture in position to be moved from the storage compartment to the viewing compartment, springs attached to the inside of the top of the viewing compartment to apply downward pressure and hold the slide or stransparent picture in viewing position, U shaped slidable means to remove one slide or stransparent picture at a time from the storage compartment to the viewing compartment and return the viewed slide to the bottom of the storage compartment on top of the spring on the slidable bottom, by moving the said slidable means inward and outward all the slides or transparent pictures in the storage compartment can be viewed in the viewing compartment and returned to the storage compartment in the same sequence as originally stored.

3. An apparatus for storing and viewing slides as described, a container having two compartments, one for storage and the other for viewing, and a spacing bar between said compartments having space above and below said spacing bar to permit the passage of slides from one compartment to the other, an adjustable lens with means mounting said lens on said container for folding movement into and out of the viewing compartment, a bottom closure plate mounted for endwise sliding movement in said container, a translucent window in said bottom closure plate to permit the passage of light to the slide to be viewed, and slide feeding means in said container operative by inward movement to push one slide at a time from a stack of slides in the storage compartment to the viewing position in the viewing compartment and operative by the outward movement to pull the viewed slide from the viewing compartment to the underside of the stack of slides in the storage compartment, so that by continuous inward and outward movement of said slidable means all slides in the storage compartment can be viewed.

4. A slide or picture viewer, in combination, a container having a spacer bar to form two compartments, spaces above and below said spacer bar to permit the moving of slides or pictures above and below said spacer bar from one compartment to the other, one of said compartments to store slides to be viewed and the other compartment for viewing one slide at a time, said viewing compartment having front and back openings to permit the passage of light therethough, a closure cover hinged to said container and adapted for swinging movement between a closed position closing said front opening and an open position extending outwardly from said container substantially at right angles to said front opening, a viewing lens pivotally mounted on said hinged closure cover for swinging movement into an inwardly folded position lying substantially parallel to the under side of said closure cover for reception in said viewing compartment when said closure cover is moved into its closed position, said viewing lens being adapted to be swung outwardly to an operative position projecting substantially at right angles to said closure cover when the latter is swung outwardly to its open position whereby said viewing lens is then disposed substantially parallel with said viewing compartment, slidable means to remove one slide at a time from the upper portion of said storage compartment to the lower portion of said viewing compartment and after viewing to return said slide to the lower portion of said storage compartment, spring means to produce upward pressure on the slide in said storage compartment and downward pressure on the slide to be viewed in the viewing compartment, whereby moving said slidable means inward and outward all the slides or pictures can be viewed and returned to the storage compartment in the same sequence as originally stored.

5. In a slide or picture viewer, the combination of a container having a storage compartment at one end to store one or more slides and a viewing compartment at the other end for viewing one slide at a time, said viewing compartment having front and back openings in said container to permit the passage of light therethrough, a closure cover hinged to said container and adapted for swinging movement between a closed position closing said front opening and an open position extending outwardly from said container substantially at right angles to said front opening, a viewing lens pivotally mounted on said hinged closure cover for swinging movement into an inwardly folded position lying substantially parallel to the under side of said closure cover for reception in said viewing compartment when said closure cover is moved into its closed position, said viewing lens being adapted to be swung outwardly to an operative position projecting substantially at right angles to said closure cover when the latter is swung outwardly to its open position whereby said viewing lens is then disposed substantially parallel with said viewing compartment, U-shaped slidable means to move one slide or picture at a time from the storage compartment into said viewing compartment and after viewing return the viewed slide or picture to the storage compartment, whereby the inward and outward movement of said U-shaped slidable means moves a new slide into the viewing compartment and return the viewed slide to the storage compartment until all of the slides or pictures in the storage compartment have been viewed.

6. In a slide viewer, the combination of a container having a storage compartment for storing slides to be viewed and a viewing compartment for viewing the slides one at a time, said viewing compartment having front and back openings to permit the passage of light therethrough, a closure cover hinged to said container and adapted for swinging movement between a closed position closing said front opening and an open position extending outwardly from said container substantially at right angles to said front opening, a viewing lens pivotally mounted on said hinged closure cover for swinging movement into an inwardly folded position lying substantially parallel to the under side of said closure cover for reception in said viewing compartment when said closure cover is moved into its closed position, said viewing lens being adapted to be swung outwardly to an operative position projecting substantially at right angles to said closure cover when the latter is swung outwardly to its open position whereby said viewing lens is then disposed substantially parallel with said viewing compartment, and means operative to move one slide at a time from the storage compartment to the viewing compartment and to return said slide after being viewed to the storage compartment.

7. In a slide viewer, the combination of a container having two compartments, one at the rear end of the container for storing slides to be viewed and the other at the front end of the container through which the slides can be viewed one at a time, a division member between said compartments with spaces above and below to permit the movement of slides from one compartment to the other, means in said storage compartment to exert upward pressure on slides to be stored, means in said viewing compartment to exert downward pressure on slides to be viewed, a rear guide opening in the rear end of said container at the outer end of said storage compartment, slide feeding means in said container having guided travel inwardly and outwardly through said rear guide opening, said slide feeding means comprising pusher means at its upper portion operative to push one slide at a time from said storage compartment into said viewing compartment when said slide feeding means is pushed forwardly through said rear guide opening toward said viewing compartment, said slide feeding means comprising puller means operative to pull the viewed slide from the viewing compartment to the storage compartment when the slide feeding means is pulled in a rearward direction out through said guide opening at the rear end of said container, said pusher means moving outwardly to a position substantially clear of said storage compartment when said slide feeding means is pulled outwardly to its outermost position, whereby to enable slides to be inserted into and removed from said storage compartment through the upper portion thereof, and means for holding the stored slides in said storage compartment against outward translational motion during such outward sliding movement of said slide feeding means.

8. In a slide viewer, the combination of a container having two compartments, one at the rear end of the container for storing slides to be viewed and the other at the front end of the container through which the slides can be viewed one at a time, a division member between said compartments with spaces above and below to permit the movement of slides from one compartment to the other, means in said storage compartment to exert upward pressure on slides to be stored, means in said viewing compartment to exert downward pressure on slides to be viewed, a rear guide opening in the rear end of said container at the outer end of said storage compartment, and slide feeding means in said container having guided travel inwardly and outwardly through said rear guide opening, said slide feeding means comprising pusher means at its upper portion operative to push one slide at a time from said storage compartment into said viewing compartment when said slide feeding means is pushed forwardly through said rear guide opening toward said viewing compartment, said slide feeding means comprising puller means operative to pull the viewed slide from the viewing compartment to the storage compartment when the slide feeding means is pulled in a rearward direction out through said guide opening at the rear end of said container, said pusher means moving outwardly to a position substantially clear of said storage compartment when said slide feeding means is pulled outwardly to its outermost position.

9. In a slide viewer, the combination of a container having two compartments, one for storing slides to be viewed and the other to view said slides one at a time, said storage compartment having an open top through which slides are adapted to be inserted and removed, a division member between said compartments with spaces above and below to permit the movement of slides from one compartment to the other compartment, means in said storage compartment to exert upward pressure on slides stored therein, means in said viewing compartment to exert downward pressure on the slide to be viewed, slide feeding means in said container having at its upper portion pusher means to push one slide at a time from said storage compartment to said viewing compartment, and having puller means at its lower portion to pull the viewed slide from the viewing compartment to the storage compartment, and a hinged door in the top of said container for normally closing the open top of said storage compartment through which slides can be inserted into said storage compartment.

10. An apparatus for storing and viewing slides as set forth in claim 8 wherein said container has a bottom closure plate mounted for endwise sliding movement in said container.

11. An apparatus for storing and viewing slides as set forth in claim 8 wherein said storage compartment has a hinged door at the top which can be opened to permit the placing or removal of said slides when desired.

12. In a slide viewer of the class described, the combination of a casing having a slide storing compartment at one end for storing a stack of slides, and a slide viewing compartment at the other end having window means therein for viewing the slides individually as they are fed to said viewing compartment from said storing compartment, slide feeding means reciprocably mounted in said casing for feeding the slides individually from said storing compartment to said viewing compartment and then back to said storing compartment, said slide feeding means comprising a slide pusher adapted to engage the top slide of said stack at that edge of the slide remote from said viewing compartment for pushing said slide from said storing compartment to said viewing compartment, said slide feeding means also comprising a slide puller having a hook shaped end adapted to hook against the slide in said viewing compartment at that edge of the slide remote from said storing compartment for pulling said slide from said viewing compartment to the bottom of the stack in said storing compartment, said slide feeding means being guided in said casing for inward reciprocation to an innermost position in which both said slide pusher and said slide puller are substantially within the confines of said casing, and being guided for outward reciprocation to an outermost position in which at least the major portion of said slide pusher is outside of the confines of said casing, said inward reciprocation moving the top slide of the stack into the viewing compartment and said outward reciprocation returning said slide to the bottom of said stack, gripping means on the outermost end of said slide feeding means for grasping and operating said slide feeding means at a point remote from said viewing compartment, and means affording access to said storing compartment for permitting slides to be inserted or removed either singly or in stacks.

13. In a slide viewer of the class described, the combination of a casing having a slide storing compartment at one end for storing a stack of slides, and a slide viewing compartment at the other end having window means therein for viewing the slides individually as they are fed to said viewing compartment from said storing compartment, and slide feeding means reciprocably mounted in said casing for feeding the slides individually from said storing compartment to said viewing compartment and then back to said storing compartment, said slide feeding means comprising a slide pusher adapted to engage the top slide of said stack at that edge of the slide remote from said viewing compartment for pushing said slide from said storing compartment into said viewing compartment, said slide feeding means also comprising a slide puller adapted to hook against the slide in said viewing compartment at that edge of the slide remote from said storing compartment for pulling said slide from said viewing compartment to the bottom of the stack in said storing compartment, said slide feeding means being capable of inward movement to an innermost position in which both said slide pusher and said slide puller are substantially within the confines of said casing, and being capable of outward movement to an outermost position in which at least the major portion of said slide pusher is outside of the confines of said casing, said inward movement moving the top slide of the stack into the viewing compartment and said outward movement returning said slide to the bottom of the stack.

JOSEPH ANTOS.

REFERENCES CITED

The following references are of record in the file of this patent:

UNITED STATES PATENTS

| Number | Name | Date |
| --- | --- | --- |
| 129,764 | Stone | July 23, 1872 |
| 1,989,454 | Koster | Jan. 29, 1935 |
| 2,516,793 | Mueller | July 25, 1950 |

FOREIGN PATENTS

| Number | Country | Date |
| --- | --- | --- |
| 667,104 | France | June 3, 1929 |